US006035780A

United States Patent [19]

Badesha et al.

[11] Patent Number: 6,035,780

[45] Date of Patent: Mar. 14, 2000

[54] COMPATIBILIZED BLEND OF FLUOROELASTOMER AND POLYSILOXANE USEFUL FOR PRINTING MACHINE COMPONENT

[75] Inventors: Santokh S. Badesha, Pittsford; Clifford O. Eddy, Webster; Arnold W. Henry, Pittsford; Gregory A. Campbell, Canton, all of N.Y.

[73] Assignee: Xerox Corporation, Stamford, Conn.

[21] Appl. No.: 09/058,923

[22] Filed: Apr. 13, 1998

[51] Int. Cl.[7] ............................ B41F 21/00; B32B 27/28

[52] U.S. Cl. ............................ 101/217; 492/56; 492/59; 428/421; 428/422; 428/447

[58] Field of Search .................................... 525/101, 102, 525/104, 106, 192, 193, 194, 197; 101/103, 109, 457, 216, 217; 492/56, 59; 428/421, 422, 447

[56] References Cited

U.S. PATENT DOCUMENTS

| | | | |
|---|---|---|---|
| 4,260,698 | 4/1981 | Tatemoto et al. | 525/102 |
| 4,263,414 | 4/1981 | West | 525/102 |
| 5,480,930 | 1/1996 | Gentle et al. | 524/414 |

*Primary Examiner*—Mark L. Warzel
*Attorney, Agent, or Firm*—John L. Haack

[57] ABSTRACT

A process including:

forming a first mixture of a first fluoroelastomer, and a first polymeric siloxane containing free radical reactive functional groups; and forming a second mixture of the resulting product with a mixture of a second fluoroelastomer and a second polysiloxane compound, and wherein the resulting product of the dissimilar polymeric materials is a phase compatible blend.

The phase compatible blend is useful as a component of electrostatographic and liquid ink printing machines, including long-life fuser rolls, backing rolls, transfer and transfuse belts and rolls and bias charging and bias transfer rolls.

17 Claims, No Drawings

COMPATIBILIZED BLEND OF FLUOROELASTOMER AND POLYSILOXANE USEFUL FOR PRINTING MACHINE COMPONENT

REFERENCE TO COPENDING AND ISSUED PATENTS

Attention is directed to commonly owned and assigned copending applications: U.S. Ser. No. 08/054,172 (D/90415) filed Apr. 30, 1993, entitled "Electrophotographic Imaging Members and Method of Making".

Attention is directed to commonly owned and assigned U.S. Pat. No. : 5,166,031 issued Nov. 24, 1992, entitled "Novel Material Package for Fabrication of Fusing Components".

The disclosures of each the above mentioned patents and copending applications are incorporated herein by reference in their entirety.

BACKGROUND OF THE INVENTION

The present invention is generally directed to processes for the preparation of compatibilizer compounds for use in compatibilizing processes for incompatible mixtures of elastomers, thermoplastic resin, thermosetting resins, polymeric particles, and the like materials. More specifically, the present invention relates to processes for the preparation of compatibilizer compounds and their use in forming highly phase compatible and phase stable blends of otherwise incompatible mixtures of the elastomers and resin materials.

The processes of the present invention enables, for example, the preparation of highly phase compatible and thermally stable elastomer films, coatings, articles, and the like, which can be incorporated into mechanical devices to provide for example, useful material benefits such as improved performance and lifetimes under thermally and mechanically stressful operating conditions.

PRIOR ART

The prior art discloses methods of preparing compatibilizers and compatibilized elastomer blends, for example, where U.S. Pat. No. 5,480,930, issued Jan. 2, 1996, to Gentle et al., discloses uncured fluorocarbon elastomer base compositions and cured fluorocarbon elastomer compositions comprising a fluorocarbon elastomer, an amorphous silicone resin, and optionally a polydiorganosiloxane gum or a hydrocarbon polymer elastomer. The cured fluorocarbon elastomers typically contain additional components such as an acid acceptor, a cure agent, and a filler. The cured compositions have high strength, low temperature flexibility, high solvent resistivity, and low fuel permeability.

The aforementioned reference is incorporated in its entirety by reference herein.

Practitioners have sought an efficient and environmentally efficacious method for elastomer blend preparation which affords blends that are resistant to phase separation, or phase aggregation. There remains a need for simple and economical processes for the preparation elastomer compatibilizer compounds and compatibilized elastomer blends.

SUMMARY OF THE INVENTION

Embodiments of the present invention, include:

Overcoming, or minimizing deficiencies of prior art processes, by providing preparative processes for elastomer compatibilizers and compatibilized elastomer blends with improved phase stability and compatibility;

A process comprising:

forming a first mixture of a first fluoroelastomer, and a first polymeric siloxane containing free radical reactive functional groups; and forming a second mixture of the resulting product with a mixture of a second fluoroelastomer and a second polysiloxane compound, and A process for the preparation of an elastomer compatibilizer compound comprising:

forming a melt mixture of a fluoroelastomer, and a copolymeric siloxane containing from about 0.1 to about 50 mole percent of free radical reactive functional groups, and wherein there results a compatibilizer compound comprised of a reaction product of the fluoroelastomer and the copolymeric siloxane.

These and other aspects of the present invention are disclosed and illustrated herein.

DETAILED DESCRIPTION OF THE INVENTION

The preparative processes of the present invention may be used to prepare a variety of blends or mixtures of typically phase incompatible or unstable mixtures of elastomers, resins, plastics, and related materials, and the like, and mixtures thereof.

The processes and products of the present invention are useful in many applications, for example, as compatibilized blend compositions and processes thereof which include, componentry for xerographic marking and document handling, liquid immersion development xerography, including long life fuser rolls, backing rolls, transfer and transfuse belts and rolls, bias charging and bias transfer rolls, and the like.

In embodiments, the present invention provides preparative processes comprising, for example, forming a first melt mixture of a first fluoroelastomer, and a first copolymeric siloxane containing free radical reactive functional groups to afford a polymeric compatibilizer product; and forming a second mixture of the polymeric compatibilizer product with a second mixture of a second fluoroelastomer and a second polysiloxane compound, wherein the resulting product of dissimilar polymeric materials is a phase compatible blend.

There is also provided a process for the preparation of elastomer compatibilizer compounds comprising:

forming a melt mixture of a fluoroelastomer, and a copolymeric siloxane containing from about 0.1 to about 50 mole percent of free radical reactive functional groups, and wherein there results a compatibilizer compound comprised of a reaction product of the fluoroelastomer and the copolymeric siloxane.

The aforementioned melt mixing can be accomplished by heating at temperatures of about 25 to about 150° C., for a suitable time, for example about 5 minutes to about 10 hours, and wherein the resulting phase compatible blend is thermally stable against separation for from about 6 months to about 2 years, and from about 2 months to about 1 year at from about 0 to about 220° C., as measured by, for example, transmission electron microscopy (ATEM) which is capable of detailed examination of the resulting dispersion quality.

The present compatibilization process can further comprise including a free radical initiator compound in the first melt mixture of the first fluoroelastomer and the first copolymeric siloxane and wherein a blend comprised of directly crosslinked first fluoroelastomer and first copolymeric siloxane results, that is, wherein the backbones of the respective fluorinated polymer and the siloxane·polymer are covalently bonded to each other at least one site. Still further the present invention can include cross-linking the resulting phase compatible blend either by direct methods such as including a free radical initiator compound in the second melt mixture or including a free radical initiator compound and a crosslinking compound, such as carbon—carbon unsaturated compounds or bisphenol in the second melt mixture. Examples of crosslinking compounds include VC-50, a bisphenol based compound available from E. I. DuPont deNemours, Inc. and DIAK No. 1, 3 and 4, amine based compounds available from E. I. DuPont deNemours, Inc. and aminosilanes and siloxanes.

The polymeric compatibilizer product formed in the first melt mixture is preferably melt blended in the second melt mixture containing the second fluoroelastomer and the second polysiloxane compound in amounts of, for example, from about 0.1 to about 10 weight percent of the total compatibilized blend. The first and second fluoroelastomers can be present in amounts of about 5 to about 95 weight percent, and preferably from about 10 to about 90 weight percent of the total weight of the phase compatible blend. The first and second copolymeric siloxanes can be present in amounts of about 95 to about 5 weight percent, and preferably from about 90 to about 10 weight percent of the total weight of the phase compatible blend. The free radical reactive functional groups of the first copolymeric siloxane can be present in an amount of about 0.1 to 50 mole percent based on the total weight of the first copolymeric siloxane. The process, if desired, can further comprise including in the first melt mixture a peroxy silane compound containing at least one unsaturated carbon carbon bond, which peroxy silane compound provides the chemical functionality to accomplish free radical initiated cross linking and an unsaturated cross linking compound. There are many suitable peroxy silane compounds; and an example of a preferred peroxy silane compound is vinyl tris (t-butyl peroxy) silane.

The first and second fluoroelastomers can be fluorinated polymers or copolymers prepared, for example, from known monomers such as vinylidene fluoride, hexafluoropropylpene, tetrafluoroethylene, alkenes with from 2 to about 5 carbon atoms such as ethylene, propylene, and the like polymerizable alkenes, perfluoromethylvinylether, chlorotrifluoroethylene, and the like monomer, and mixtures thereof. Examples of commercially available fluoroelastomer materials include the VITON® family of compounds available from Du Pont Corporation, the FLUOREL® family of compounds available from 3M Corporation, the TECNOFLON® family of compounds available from Ausimont.

The first and second copolymeric siloxane can be comprised of polymer subunits including compounds such as dialkylsiloxanes wherein the alkyl groups are independently selected and contain from 1 to about 20 carbon atoms, alkylarylsiloxanes wherein the alkyl groups contains from 1 to about 20 carbon atoms and the aryl group contains from 6 to about 20 carbon atoms, diarylsiloxanes wherein the aryl groups are independently selected and contains from 6 to about 20 carbon atoms, substituted alkyl groups such as chloropropyl, trifluoropropyl, mercaptopropyl, carboxypropyl, aminopropyl and cyanopropyl, substituted alkenyl groups such as vinyl, propenyl, chlorovinyl and bromopropenyl and mixtures thereof. Examples of commercially available copolymeric siloxane materials include Dow Corning Silastic 590 series, 9280 series, 9390 series, 3100 series, Sylgard series, 730 series, GP series, HS series, NPC series, LCS series, LT series, TR series; General Electric SE series including SE 33, FSE series, 2300, 2400, 2500, 2600 and 2700 and Wacker Silicones Elastosil LR series, Elektroguard series, c- series, SWS series, S- series, T-series and V- series. The first and second fluoroelastomers for example possess various suitable molecular weights, such as a molecular weight Mw of about 3,000,000 to about 5,000,000, and the first and second copolymeric siloxane can have a molecular weight of about 500,000 to about 700,000

The aforementioned free radical reactive functional groups of the first or second copolymeric siloxane can be provided by compounds with at least one unsaturated carbon—carbon bond, and mixtures thereof. Free radical initiator compounds used for cross linking can include known free radical initiator compounds such as peroxides, for example, hydrogen peroxide, alkyl peroxides, and the like compounds, persulfates, azo compounds, for example, AIBN and the like compounds, and mixtures thereof, which initiator compounds are present in amounts of from about 0.1 to about 10 weight percent based upon the weight of the cross linking compound.

The first and second melt mixtures can be formed in any suitable melt mixing apparatus such as a Banbury internal mixer or an extruder. Both the first and second melt mixtures subsequent to heating are phase compatible, are resistant to phase separation or aggregation, and have a stable shelf life at 0° C. to about 100° C. for about 2 months to about 1 year. It is apparent that the second melt mixture is phase incompatible and unstable with respect to phase separation in the absence a compatibilizing compound obtained in the first melt mixture. The compatibilty and stability of the phases of the resulting melt mixtures can be readily assessed and quantitated, for example, by optical and electron microscopic techniques such as an ATEM.

In embodiments, the first fluoroelastomer and the first copolymeric siloxane can be either the same or different as the second fluoroelastomer and the second polysiloxane compound.

The phase compatible blends of the present invention can be utilized in a variety of applications, for example, in coatings and films which may require the attributes of both the durability and thermal stability of the fluoroelastomer compounds, and the flexibility and surface wetting and release characteristics of the polysiloxane compounds. The films and coatings of the compatibilized blends can be used to fabricate componentry and articles for use in, for example, electrostatographic and liquid ink printing machines, and more specifically-including long life fuser rolls, backing rolls, transfer and transfuse belts and rolls, bias charging and bias transfer rolls, and the like.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

Materials used in the Examples that follow included: vinyl-substituted silicone gum (SE 33) available from General Electric Co., and vinyldimethylterminated polydimethylsiloxane (PS 441.2) obtained from Huls of America. Vinylidene fluoride/hexafluoropropylene/tetrafluoroethylene copolymer (VITON GF) was obtained from Du Pont, and vinyl-substituted silicone gum (SE 33) is available from General Electric Co. Vinyl tris(t-butyl peroxy)silane was prepared according to the procedure described in U.S. Pat. No. 3,631,161, the disclosure of which is incorporated herein in its entirety.

Melt blends of polymers were prepared in Haak Rheomix 600 Batch Mixer with roller blades. The temperature was controlled by a Haak Model t-64 Temperature Controller. Morphology of the polymer blends was characterized with an Olympus BX 50 polarized microscope equipped with Mettler FP82 HT hot stage controlled by FP90 central processor and recorded with a Sony SSC-S20 color video camera. Analytical Transmission Electron Microscopy (ATEM) and Energy Dispersive x-ray Spectroscopy (EDX) were used to examine the dispersion quality and elemental analysis of the domains of the dispersion, respectively. The instrument used was Jeol Model No. JEM 2000FX.

Preparation of polymer blends. The blends were prepared using a commercially available twin-rotor batch mixture with temperature control. The coupling mechanism of the compatibilizer compound was effected by heating at a processing temperature greater than its decomposition temperature of about 154° C. The blending times varied from about 15 to about 45 minutes.

COMPARATIVE EXAMPLE I

Blending of VITON GF and Silicone SE-33 without compatibilizer Fifty grams of VITON GF and 50 grams of Silicone SE-33 were blended in a twin-rotor batch mixer with temperature control at about 60 rpm for about 30 minutes. This mixture was then melt blended at about 140° C. for about 15 minutes. The temperature was then raised to about 160° C. for about an additional 15 minutes. Morphology of the polymer blend was observed and the photographic record of the morphology of the blend of VITON GF and silicone SE-33 indicated that the components were reasonably well dispersed in one another. However, when this blend was then allowed to stand at room temperature, about 25° C. for about one week and then again imaged through the polarized microscope, considerable phase separation was observed which indicates that the blend was unstable. This blend was then again melt-blended at about 220° C. for about 30 minutes in the Haak Rheomixer and imaged through the polarized microscope. There was indicated that some blending occurred but that there still remained large separated domains of VITON and silicone indicating that the blend was incompatible and unstable with respect to phase separation. When an unstable blend is used to fabricate printing machine components, such as the coating on a heated fuser roll, the useful operational lifetime is short, for example for about 10,000 impressions or less before visible wear and poor release characteristics are observed.

EXAMPLE I

Blending of VITON GF and Silicone SE-33 with Vinyltris (t-butyl peroxy)silane compatibilizer A mixture of 50 grams of VITON GF, 0.1 grams of vinyl tris(t-butyl peroxy)silane and 50 grams of SILICONE SE-33 were blended in a twin-rotor batch mixture with temperature control. The mixing was done at about 60 rpm for about 30 minutes. This mixture was then melt blended in accordance with Comparative Example I at about 140° C. for about 15 minutes. The temperature was then raised to 160° C. for an additional 15 minutes. The observed morphology of the blend indicated that the VITON GF and silicone SE-33 were well dispersed in one another.

The above blend was then allowed to remain at room temperature(25° C.) for about a week and then imaged through the polarized microscope where there was observed no apparent phase separation thereby indicating that the blend was stable. Thus in a printing machine as a coating on a heated fuser roll, the compatibilized mixture had a useful operational lifetime, for example of about 10,000,000 impressions or more before visible wear and poor release characteristics are observed.

COMPARATIVE EXAMPLE II

Blending of VITON GF and Silicone SE-33 without compatibilizer Twenty grams of VITON GF and 80 grams of Silicone SE-33 were blended in a twin-rotor batch mixture with temperature control. The mixing was done at 60 rpm for 30 minutes. This mixture was then melt blended in accordance with Example I at about 140° C. for about 15 minutes, and then the temperature was then raised to about 160° C. for about an additional 15 minutes, then cooled to room temperature and observed microscopically. The morphology of the blend indicated that the VITON GF and silicone SE-33 components were reasonably well dispersed in one another.

The above blend was then allowed to stand at room temperature for about a week and then imaged through the polarized microscope and which images showed that the blend had grossly phase separated. This blend was remelted-blended at about 220° C. for 30 minutes in the Haak Rheomixer and imaged through the polarized microscope and which images indicated that there was some apparent blending of the components but there remained large domains of phase separated VITON and silicone.

EXAMPLE II

Blending of VITON GF and Silicone SE-33 with Vinyl tris(t-butyl peroxy)silane compatibilizer A mixture of 20 grams of VITON GF, 0.1 grams of vinyl tris(t-butyl peroxy) silane, and 80 grams of Silicone SE-33 were blended and melt mixed in accordance with Comparative Example II. The morphology of the resulting images of the blend indicated that the VITON GF and silicone SE-33 components were in excellent dispersion.

The above blend was then allowed to stand at room temperature (25° C.) for about a week and imaged through the polarized microscope. The resulting images indicated very Little or no phase separation and suggested that the blend was very stable.

A sample, about 10 grams of the blend was then trimmed to a fine point with a razor blade, cryo-ultramicrotoned and examined by ATEM. The micrographs showed that the VITON GF component is homogeneously dispersed in a silicone polymer matrix. A confirmation of the structure of the observed domains was provided by Energy Dispersive x-ray Spectroscopy (EDX). The results comprised a silicon peak and a fluorine peak suggesting that the blend is comprised of uniformly distributed silicon atoms representing the silicon atoms of the Silicone SE-33, and the light colored domains observed microscopically suggest that the fluorinated VITON® component is highly interspersed, that is about 90 to about 99 percent dispersed in the siloxane component.

EXAMPLE III

Blending of VITON GF and Silicone SE-33 with vinyldimethylterminated polydimethylsiloxane (PS 441.2) compatibilizer A mixture of 50 grams of VITON GF, 10 grams of vinyldimethylterminated polydimethylsiloxane (PS 441.2), and 50 grams of Silicone SE-33 were blended in accordance with Comparative Example II. The morphology of the resulting blend of VITON GF, silicone SE-33, and compatibilizer appeared to be good. The above blend was then allowed to stand at room temperature for about a week and reheated at 220° C. for 30 minutes in the Haak-Rheomixer and imaged through the polarized microscope. The resulting microscopic images indicated an excellent dispersion and stable dispersion of the VITON GF in Silicone SE-33.

EXAMPLE IV

Blending of VITON GF and Silicone SE-33 with vinyidimethylterminated polydimethylsiloxane (PS 441.2) compatibilizer A mixture of 20 grams of VITON GF, 10 grams of vinyidimethylterminated polydimethylsiloxane (PS 441.2), and 80 grams of Silicone SE-33 were blended in accordance with Comparative Example II. The microscopic observation of the resulting blend indicated that the morphology of the resulting dispersions of the blend of VITON GF, silicone SE-33, and the vinyidimethylterminated polydimethylsiloxane were quite good.

From the examples and as summarized in the Table below it is apparent that blends without the compatibilizer compounds are not stable in that they phase separate, and that both vinyidimethylterminated polydimethylsiloxane (PS 441.2) and vinyl tris(t-butyl peroxy)silane when used in accordance with the present invention provide excellent phase compatibility and stability against phase separation. Also, silyl peroxide provides excellent phase stabilization of the blends at elevated temperatures of for example from about 100 to about 220° C. and over extended periods of time of, for example, from about from about 2 months to about 1 year.

TABLE 1

Preparation of Polymer Blends

| Composition of Polymer Blends | | | | Processing Condition | |
|---|---|---|---|---|---|
| VITON GF | Silicone SE 33 | Peroxide VTTBPS* | PS 441.2 ** | rpm/t (min) | T (° C.)/t (min) |
| 50 | 50 | — | — | 100/40 | 170/40 |
| 50 | 50 | — | — | 40/5,60/5, 100/5,60/25 | 80/15,140/25 |
| 20 | 80 | — | — | 60/30 | 140/15,160/15 |
| 50 | 50 | 2 | — | 100/10 | 170/10 |
| 50 | 50 | 1 | — | 40/5,60/5, 100/5,60/15 | 80/15,140/15 |
| 50 | 50 | 0.1 | — | 60/30 | 140/15,160/15 |
| 50 | 50 | 0.1 | | 60/30 | 140/15,160/15 |
| 20 | 80 | 0.1 | — | 60/30 | 140/15,180/15 |
| 50 | 50 | — | 10 | 60/30 | 140/10,160/15 |
| 50 | 50 | — | 10 | 60/30 | 160/30 |
| 20 | 80 | — | 10 | 60/30 | 160/30 |

*VTTBPS is vinyl tris(t-butyl peroxy)silane
**PS 441.2 is vinyldimethylterminated polydimethylsiloxane Other modifications of the present invention may occur to one of ordinary skill in the art based upon a review of the present application and these modifications, including equivalents thereof, are intended to be included within the scope of the present invention.

What is claimed is:

1. A printing machine comprising:

at least one machine component comprised of the phase compatibilized blend of incompatible polymeric materials, wherein said compatibilized blend is prepared in accordance with a process comprising forming a first mixture of a first fluoroelastomer, and a first polymeric siloxane containing free radical reactive functional groups, to produce a polymeric compatibilizer product; and forming a second mixture with the resulting polymeric compatibilizer product and with a mixture of a second fluoroelastomer and a second polysiloxane compound, wherein the resulting product of said second mixture is a phase compatible polymeric blend.

2. A printing machine in accordance with claim 1, wherein forming the first and second mixture is accomplished by melt mixing in an extruder with heating at a temperature of about 25 to about 150° C., for about 5 minutes to about 10 hours.

3. A printing machine in accordance with claim 1, wherein the phase compatible blend is stable from about 2 months to about 1 year at from about 0 to about 220° C.

4. A printing machine in accordance with claim 1, further comprising including a free radical initiator compound in the first melt mixture of the first fluoroelastomer and the first copolymeric siloxane.

5. A printing machine in accordance with claim 1, further comprising cross-linking the resulting phase compatible blend.

6. A printing machine in accordance with claim 1, wherein the polymeric compatibilizer product formed in the first mixture is mixed with the second fluoroelastomer and the second polysiloxane compound in an amount of about 0.1 to about 10 weight percent of the total final mixture.

7. A printing machine in accordance with claim 1, wherein the first and second fluoroelastomers are present in an amount of about 5 to about 95 weight percent of the total weight of the final blend, the first and second copolymeric siloxanes are present in an amount of about 95 to about 5 weight percent of the total weight of the final blend, and the free radical reactive functional groups of the first copolymeric siloxane are present in an amount of about 0.1 to 50 mole percent based on the weight of the first copolymeric siloxane.

8. A printing machine in accordance with claim 1, further comprising including in the first melt mixture a peroxy silane compound containing at least one unsaturated carbon-carbon bond.

9. A printing machine in accordance with claim 1, wherein the peroxy silane compound is vinyl tris (t-butyl peroxy) silane.

10. A printing machine in accordance with claim 1, wherein the first and second fluoroelastomers are fluorinated polymers or fluorinated copolymers prepared from monomers selected from the group consisting of vinylidene fluoride, hexafluoropropylpene, tetrafluoroethylene, alkenes with from 2 to about 5 carbon atoms, perfluoromethylvinylether, chlorotrifluoroethylene, and mixtures thereof.

11. A printing machine in accordance with claim 1, wherein the first and second copolymeric siloxanes are comprised of polymer subunits selected from the group consisting of:

dialkylsiloxanes, wherein the alkyl groups are independently selected and contain from 1 to about 20 carbon atoms;

alkylarylsiloxanes, wherein the alkyl groups are independently selected and contain from 1 to about 20 carbon atoms and the aryl groups are independently selected and contain from 6 to about 20 carbon atoms;

diarylsiloxanes, wherein the aryl groups are independently selected and contain from 6 to about 20 carbon atoms;

substituted alkyl groups wherein the substituted alkyl groups are independently selected from chloropropyl, trifluoropropyl, mercaptopropyl, carboxypropyl, aminopropyl, and cyanopropyl;

substituted alkenyl groups wherein the substituted alkenyl groups are independently selected from vinyl, propenyl, chlorovinyl and bromopropenyl; and mixtures thereof.

12. A printing machine in accordance with claim 1, wherein the free radical reactive functional groups of the copolymeric siloxane are selected from the group consisting of compounds with at least one unsaturated carbon-carbon bond, and mixtures thereof.

13. A printing machine in accordance with claim 4, wherein the free radical initiator compound is selected from the group consisting of peroxides, persulfates, azo compounds, and mixtures thereof.

14. A printing machine in accordance with claim 1, wherein the first and second fluoroelastomers have a molecular weight (Mw) of about 3,000,000 to about 5,000,000, and the first and second copolymeric siloxanes have a molecular weight (Mw) of about 500,000 to about 700,000.

15. A printing machine in accordance with claim 1, wherein the mixture resulting from the second mixture is resistant to phase aggregation, and has a stable shelf life at 0° C. to about 100° C. for about 2 months to about 1 year.

16. A printing machine in accordance with claim 1, wherein the chemical identities of the first fluoroelastomer and the first copolymeric siloxane prior to mixing are respectively the same as the second fluoroelastomer and the second polysiloxane compound of the second mixture prior to mixing.

17. A printing machine in accordance with claim 1, wherein the first fluoroelastomer and the first copolymeric siloxane are the same as the second fluoroelastomer and the second polysiloxane compound.

* * * * *